United States Patent
Zaki et al.

(10) Patent No.: US 7,085,228 B2
(45) Date of Patent: Aug. 1, 2006

(54) ADAPTIVE RADIO RESOURCE MANAGEMENT FOR WIRELESS LOCAL AREA NETWORKS

(75) Inventors: Maged Zaki, Pierrefonds (CA); Shamim Akbar Rahman, Montreal (CA); Teresa Joanne Hunkeler, Montreal (CA); Guang Lu, Verdun (CA)

(73) Assignee: InterDigital Technology Corp., Wilmington, DE (US)

(*) Notice: Subject to any disclaimer, the term of this patent is extended or adjusted under 35 U.S.C. 154(b) by 0 days.

(21) Appl. No.: 10/881,606

(22) Filed: Jun. 30, 2004

(65) Prior Publication Data

US 2005/0094607 A1   May 5, 2005

Related U.S. Application Data

(60) Provisional application No. 60/518,155, filed on Nov. 7, 2003, provisional application No. 60/516,161, filed on Oct. 31, 2003.

(51) Int. Cl.
*G01R 31/08* (2006.01)
*G06F 11/00* (2006.01)
*G08C 15/00* (2006.01)

(52) U.S. Cl. .................. 370/229; 370/230.1; 370/232; 370/253; 370/338; 455/73; 455/453

(58) Field of Classification Search ................ 370/229, 370/232, 234, 235, 465, 468, 349
See application file for complete search history.

(56) References Cited

U.S. PATENT DOCUMENTS

| | | | |
|---|---|---|---|
| 5,613,198 A * | 3/1997 | Ahmadi et al. ............. | 370/337 |
| 5,708,656 A * | 1/1998 | Noneman et al. ........... | 370/335 |
| 5,857,147 A * | 1/1999 | Gardner et al. .......... | 455/67.11 |
| 6,522,628 B1 * | 2/2003 | Patel et al. ............... | 370/230.1 |
| 6,539,031 B1 * | 3/2003 | Ngoc et al. ................. | 370/470 |
| 6,714,551 B1 * | 3/2004 | Le-Ngoc ..................... | 370/401 |
| 6,760,313 B1 * | 7/2004 | Sindhushayana et al. ... | 370/252 |
| 2003/0179770 A1 * | 9/2003 | Reznic et al. ............... | 370/442 |
| 2005/0022089 A1 * | 1/2005 | Le et al. .................... | 714/749 |

* cited by examiner

*Primary Examiner*—Alpus H. Hsu
*Assistant Examiner*—Steve Blount
(74) *Attorney, Agent, or Firm*—Volpe and Koenig, P.C.

(57) ABSTRACT

In a wireless communication system including an access point and at least one wireless transmit/receive unit (WTRU), a method for adaptive radio resource management begins by examining a frame error rate value of a WTRU. Then, a channel utilization value of the WTRU and a current data rate of the WTRU are examined. System parameters for the WTRU are adjusted based on the examined variables.

11 Claims, 4 Drawing Sheets

ADAPTIVE RADIO RESOURCE MANAGEMENT FOR WIRELESS LOCAL AREA NETWORKS

CROSS REFERENCE TO RELATED APPLICATIONS

This application claims priority from U.S. Provisional Application No. 60/516,161, filed Oct. 31, 2003 and U.S. Provisional Application No. 60/518,155, filed Nov. 7, 2003, which are incorporated by reference as if fully set forth herein.

FIELD OF INVENTION

The present invention relates to radio resource management in wireless local area networks (LANs), and more particularly, to a method for adaptively managing the radio resources in a wireless LAN.

BACKGROUND

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term WTRU as used herein includes, but is not limited to, a user equipment, a mobile station, a fixed or mobile subscriber unit, a pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The term access point as used herein includes, but is not limited to, a base station, a Node B, a site controller, an access point, or other interfacing device in a wireless environment that provides WTRUs with wireless access to a network associated with the base station.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer-to-peer wireless communications. WTRUs can be configured for use in multiple networks with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

A popular wireless local area network environment with one or more WLAN access points (APs) is built according to one of the IEEE 802.11 standards. The basic service set (BSS) is the building block of an IEEE 802.11 LAN and consists of WTRUs referred to as stations. The set of stations which can talk to each other can form a BSS. Multiple BSSs are interconnected through an architectural component, called a distribution system (DS), to form an extended service set (ESS). An access point (AP) is a station that provides access to the DS by providing DS services and generally allows concurrent access to the DS by multiple stations.

The 802.11 standards allow multiple transmission rates (and dynamic switching between rates) to be used to optimize throughput. Lower transmission rates have more robust modulation characteristics that allow greater range and/or better operation in noisy environments than higher transmission rates, which provide better throughput. It is an optimization challenge to always select the best (highest) possible rate for any given coverage and interference condition.

The currently specified transmission rates of various versions of the 802.11 standard are as follows:

| Standard | Supported Rates (Mbps) |
| --- | --- |
| 802.11 (original) | 1, 2 |
| 802.11a | 6, 9, 12, 18, 24, 36, 48, 54 |
| 802.11b | 1, 2, 5.5, 11 |
| 802.11g | 1, 2, 5.5, 6, 9, 11, 12, 18, 24, 36, 48, 54 |

Conventionally, each 802.11 device has a rate control algorithm implemented in it that is controlled solely by that device. Specifically, uplink (UL) rate control is performed in stations and downlink (DL) rate control is performed in APs.

The algorithm for rate switching is not specified by the standards. It is left up to the station and AP implementation. Such rate control algorithms are usually proprietary and thus public information about them is limited. However, several algorithms have been described in academic and industry literature. Generally, they are relatively simple algorithms based on detecting missing acknowledgements (ACKs) and other statistics.

The 802.11 standard specifies a common medium access control (MAC) layer, which provides a variety of functions that support the operation of 802.11-based wireless LANs. In general, the MAC layer manages and maintains communications between stations and APs by coordinating access to a shared radio channel and utilizing protocols that enhance communications over a wireless medium. The MAC layer uses a physical (PHY) layer, such as defined in 802.11b or 802.11a, to perform the tasks of carrier sensing, transmission, and receiving of data frames.

In general, every transmitted MAC layer data frame is ACKed by the receiver. This is classically referred to as a "stop and wait" automatic repeat request (ARQ) protocol. If an ACK is not received by the transmitter (lost or never sent), then the original data frame is considered lost and the transmitter will go through the contention process again and try to re-send the data frame. A missing ACK assumes that the receiver does not get the ACK at all. However, a check to determine if an ACK frame can be partially missing (e.g., the CRC of the payload is bad, but the header information is intact) can be made. This can then be used in the decision process as a condition halfway between a missing ACK and a received ACK.

An example of an existing throughput-based rate control algorithm is as follows. First, 10% of the data is sent periodically at two data rates adjacent to the current data rate. Then, the throughput at each of the three different data rates is periodically evaluated by considering the amount of data that is successfully ACKed versus the amount of data transmitted at a given rate. Finally, a switchover is made to the data rate that provided the best throughput.

Such algorithms are one-dimensional in that they only consider their own link quality (via missing ACKs) during a given transmission. Unlike a typical station, APs generally have knowledge of the overall system and can accordingly consider more dimensions. For example, an AP can consider the UL data frame rate that was used by a given station within a given time window (e.g., the previous X seconds) as the starting point rate for its DL rate transmission to that station. An AP can also keep track of the last rate transmitted on the DL to a given station in the AP for a given period of time.

Sometimes it is better to transmit at higher rates to all stations (even with relatively high error rate) as transmitting at a low data rate to one user tends to slow down the entire system. The performance and switching points (e.g., how much error rate a typical station application can tolerate) of this type of system can be characterized and used in the AP rate control.

A cell-based finite state machine (FSM) type approach (as per 3GPP time division duplex (TDD) radio resource management (RRM)) can also be applied, where rate control can take different actions for different cell states (loads). The cell state can be set, for example, by a congestion control algorithm.

In addition, a wireless link can suffer from a high frame error rate (FER) compared to a wired link. The high FER can be due to a high traffic load, which results in more collisions and a consequently high FER; a bad wireless link condition, which can be due to high interference, fading, or a user moving away from an AP; or other reasons.

SUMMARY

The proposed RRM process manages the radio resources adaptively by acting differently depending on the reason behind the high FER. If the high FER is due to a high traffic load, the RRM will attempt to decrease or regulate the traffic load by triggering congestion control or traffic shaping functions. If the high FER is due to a bad wireless link, the RRM attempts to increase the wireless link robustness by using a more robust modulation scheme.

In a wireless communication system including an access point and at least one wireless transmit/receive unit (WTRU), a method for adaptive radio resource management begins by examining a frame error rate value of a WTRU. Then, a channel utilization value of the WTRU and a current data rate of the WTRU are examined. System parameters for the WTRU are adjusted based on the examined variables.

In a wireless communication system including an access point and at least one wireless transmit/receive unit (WTRU), a method for performing rate control begins by determining whether a downlink transmission has been made to the WTRU within a predetermined preceding time period. If a downlink transmission has been made, then the previous data rate is used as an initial data rate. If no downlink transmission has been made, then an initial data rate used prior to the predetermined time period is selected.

An apparatus for performing radio resource management (RRM) in a wireless communication system includes a measurement device, a RRM decision device, and at least one RRM action device. The measurement device is used for collecting measurements in the wireless communication system and for calculating one or more metrics based on the measurements. The RRM decision device is used for evaluating each metric against a predetermined threshold. Each RRM action device performs a single RRM function and is triggered by the RRM decision device.

An integrated circuit for performing radio resource management (RRM) in a wireless communication system includes a measurement device, a RRM decision device, and at least one RRM action device. The measurement device is used for collecting measurements in the wireless communication system and for calculating one or more metrics based on the measurements. The RRM decision device is used for evaluating each metric against a predetermined threshold. Each RRM action device performs a single RRM function and is triggered by the RRM decision device.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Figure 1:
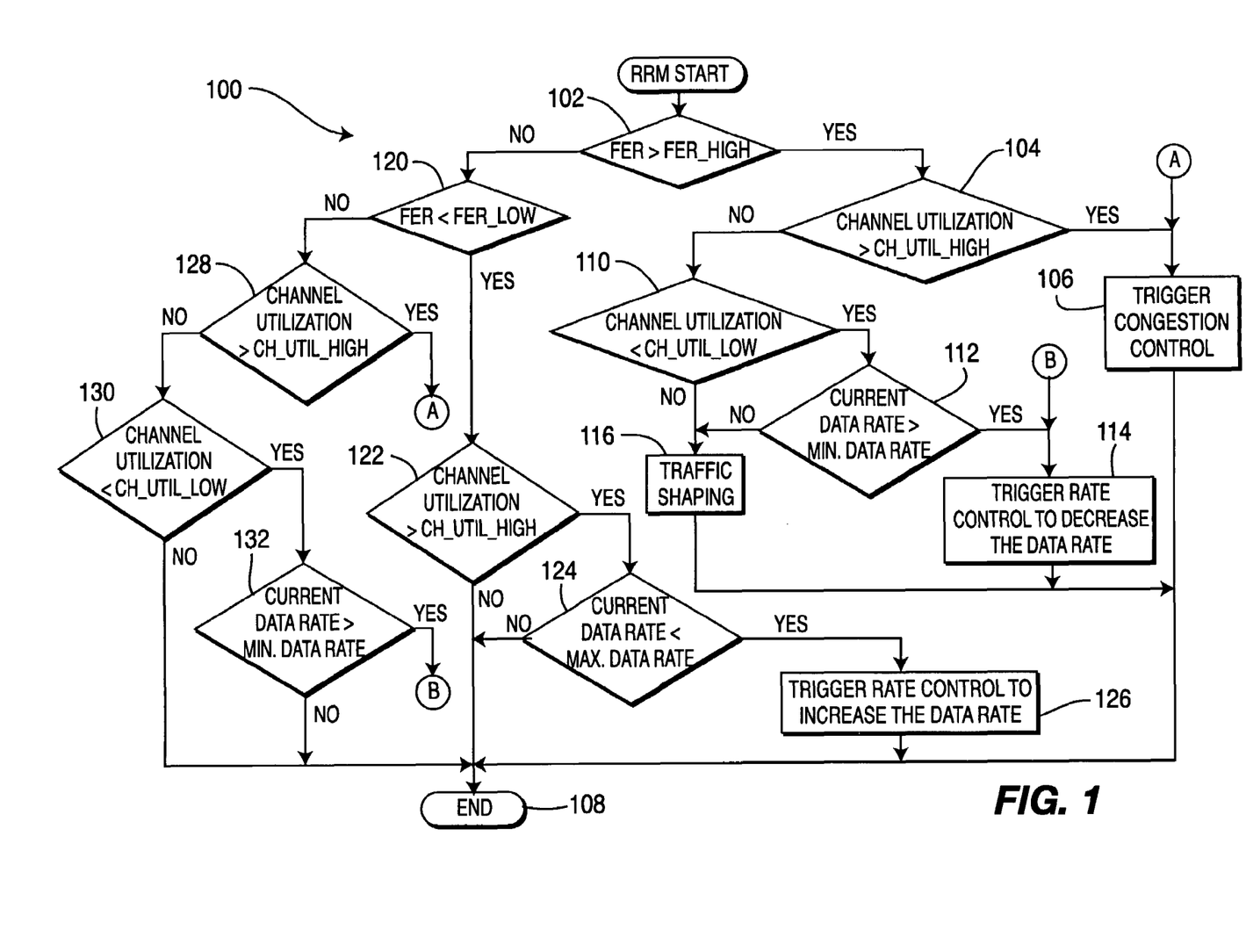
FIG. 1 is a flowchart of an adaptive radio resource management procedure in accordance with one embodiment of the present invention.

As shown in FIG. 1, a radio resource management (RRM) adaptive procedure 100 is invoked either periodically or upon detection of a high FER (FER_HIGH, which is an implementation-specific value). The procedure 100 begins by comparing the measured FER value to the high FER threshold (FER_HIGH; step 102). If the measured FER value exceeds FER_HIGH, then a comparison is made to determine if the channel utilization is greater than a high channel utilization threshold (CH_UTIL_HIGH; step 104). If the channel utilization exceeds CH_UTIL_HIGH, then congestion control is triggered (step 106) and the procedure terminates (step 108).

The goal of congestion control is to reduce the traffic load and channel utilization. In congestion control, the AP can disassociate stations which have one or more of the following characteristics: a high error rate, a low priority MAC address, and excessive channel utilization. From a scheduling perspective, the AP may hold a clear to send (CTS) signal for uplink transmission. In general, the station sends a request to send (RTS) to an AP if the RTS/CTS mechanism is enabled in the BSS. If the AP holds the CTS, the station cannot transmit packets in the uplink, thereby alleviating the congestion situation. For a user that frequently retransmits, its transmission rate can be reduced when there is congestion, which reduces the contention/collision possibilities.

If the channel utilization is below CH_UTIL_HIGH (step 104), then a determination is made whether the channel utilization is below a low channel utilization threshold (CH_UTIL_LOW; step 110). If the channel utilization is below CH_UTIL_LOW, then the current data rate is examined to determine if it is greater than the minimum data rate (step 112). If the current data rate is greater than the minimum data rate, then rate control is triggered to decrease the data rate (step 114) and the procedure terminates (step 108). Rate control is performed to reduce the data rate to match the offered traffic load. When an AP is not using all the bandwidth and it experiences a high error rate, its transmission rate can be reduced to increase the quality of transmission. With a lower data rate, a more robust modulation scheme can be used, which in turn improves the FER value.

If the current data rate is equal to the minimum data rate (step 112), then traffic shaping is used to reduce the FER value (step 116), and the procedure terminates (step 108). During traffic shaping, excess data can be delayed in order to control the traffic within the allocated bandwidth, and/or additional bandwidth can be allocated for high priority data. If the channel utilization exceeds CH_UTIL_LOW (step 110), then traffic shaping is triggered (step 116) and the procedure terminates (step 108).

If the measured FER value does not exceed FER_HIGH (step 102), then the measured FER value is compared to a low FER threshold (FER_LOW; step 120). If the measured FER value is below FER_LOW, then a comparison is made to determine if the channel utilization is greater than CH_UTIL_HIGH (step 122). If the channel utilization exceeds CH_UTIL_HIGH, then the current data rate is examined to determine if it is less than the maximum data rate (step 124). If the current data rate is less than the maximum data rate, then rate control is triggered to increase the data rate (step 126) and the procedure terminates (step 108). By increasing the data rate, the channel utilization will be lowered.

If the current data rate is already equal to the maximum data rate (step 124) or if the channel utilization does not exceed CH_UTIL_HIGH (step 122), then no further adjustments are made and the procedure terminates (step 108).

If the measured FER is above FER_LOW (step 120), then a comparison is made to determine if the channel utilization is greater than CH_UTIL_HIGH (step 128). If the channel utilization exceeds CH_UTIL_HIGH, then congestion control is triggered (step 106) and the procedure terminates (step 108). If the channel utilization is below CH_UTIL_HIGH (step 128), then the channel utilization is compared to CH_UTIL_LOW (step 130). If the channel utilization is below CH_UTIL_LOW, then the current data rate is examined to determine if it is greater than the minimum data rate (step 132). If the current data rate is greater than the minimum data rate, then rate control is triggered to decrease the data rate (step 114) and the procedure terminates (step 108).

If the current data rate is equal to the minimum data rate (step 132) or if the channel utilization is above CH_UTIL_LOW (step 130), then no further adjustments are made and the procedure terminates (step 108).

Figure 2:
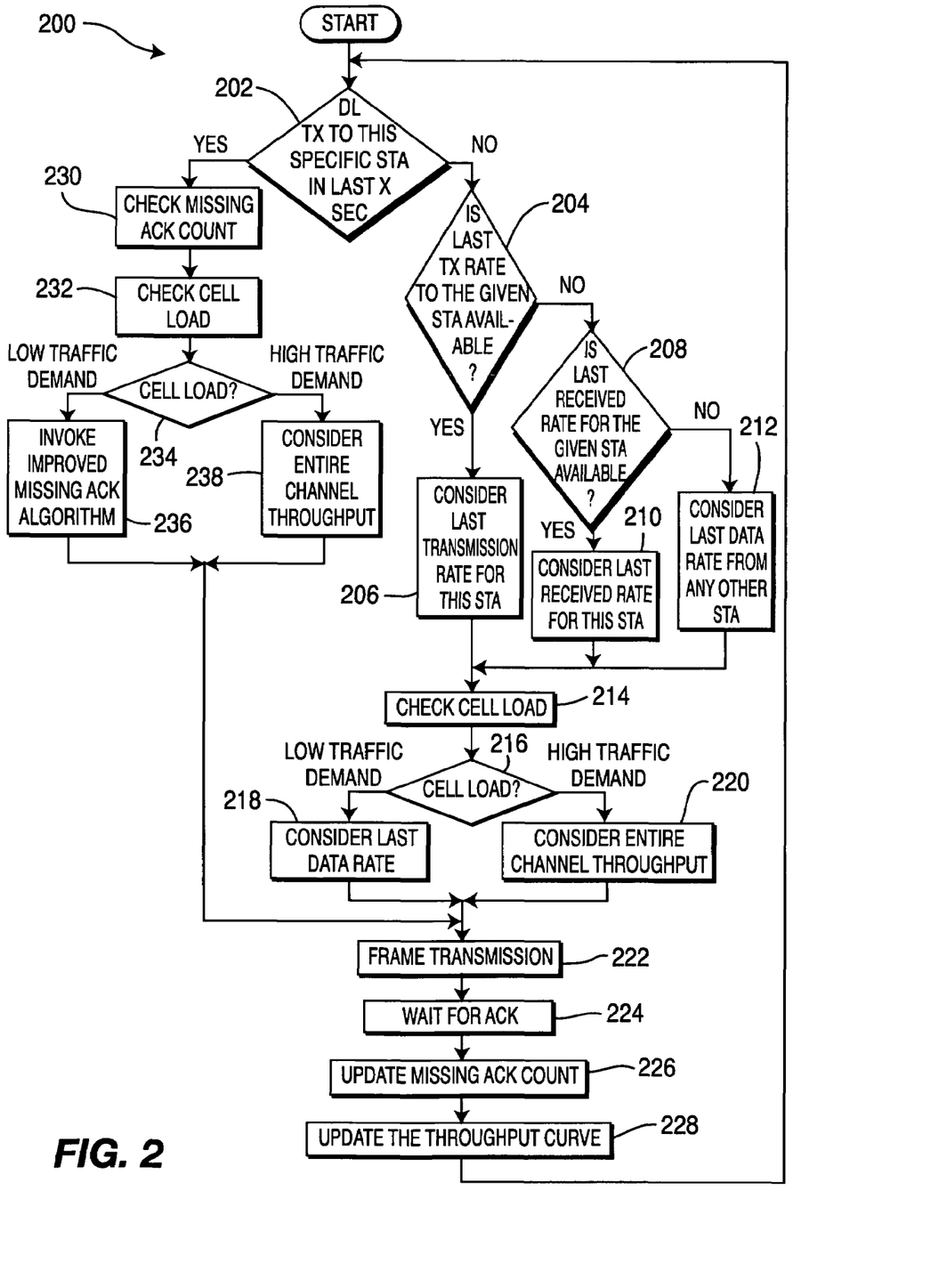
FIG. 2 is a flowchart of a rate control procedure at an AP in accordance with one embodiment of the present invention.

If rate control is triggered at step 114 or step 126, any applicable rate control procedure can be executed; the method 100 does not require the use of any particular rate control procedure. If desired, the method 100 may use a procedure 200 for rate control.

In one embodiment of the present invention, a procedure 200 as shown in FIG. 2 is used for rate control at the AP. The procedure 200 begins by determining whether a downlink (DL) transmission to a specific station was made in the last X seconds (step 202). If no transmission was made in the last X seconds, then the initial data rate is determined as follows.

A check is made whether the last transmission rate to the station is available (step 204). If the last transmission rate to the station is available, then it is considered (step 206). If the last transmission rate for the station is not available (step 204), then a check is made if the last received rate for the station is available (step 208). If the last received rate is available, then it is considered (step 210). If the last received rate is not available (step 208), then the last transmitted data rate from any other station is considered (step 212).

Regardless of the initial data rate that is considered (from step 206, 210, or 212), the cell load is then checked (step 214). The cell load statistics are stored in the AP, and is the average channel utilization in the last Y seconds. The cell load is then evaluated (step 216). In the case of low traffic demand, the initial data rate is set to the last data rate considered in step 206, 210, or 212 (step 218). In the case of high traffic demand (step 216), the initial data rate is determined by using a throughput curve, similar to that shown in FIG. 3 (step 220). These curves can be based on experimental results or can be updated dynamically and stored in a database as explained below.

Figure 3:
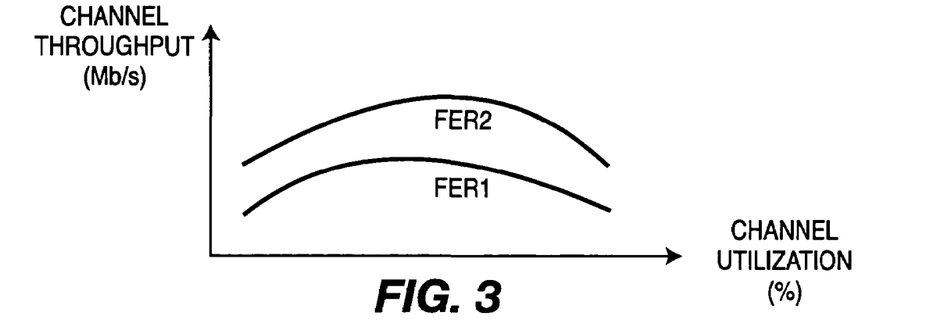
FIG. 3 is a graph of a throughput curve utilized by the rate control procedure shown in FIG. 2.

The throughput curves shown in FIG. 3 are preferably stored in memory at the AP. The curves are based on collected statistics during AP operation. The x-axis represents channel utilization, which is the current channel utilization plus the data rate for the next transmission. The y-axis is the throughput. Each curve corresponds to a certain FER range, providing the channel throughput as a function of the channel utilization and the frame error rate. The procedure selects the data rate that provides the maximum throughput for the current FER.

Once the initial data rate has been selected, the data frame is transmitted (step 222) and the AP waits for an ACK for the frame (step 224). After receiving an ACK or the ACK timeout period expires, the missing ACK count is updated (step 226) and the throughput curve is updated (step 228). The procedure then returns to step 202. Rate control is a frame-based procedure; the loop presented by returning to step 202 represents the continuous transmission of frames.

If there has been a downlink transmission made to a specific station in the last X seconds (step 202), then the missing ACK count is checked (step 230). The cell load is then checked (step 232) and evaluated (step 234). If the traffic demand is low, a missing ACK function is invoked (step 236), which is discussed in detail below.

In the case of high traffic demand, the initial data rate is determined by using a throughput curve (step 238), similar to that used in step 220. Once the transmission data rate has been selected, the data frame is transmitted (step 222) and the AP waits for an ACK for the frame (step 224). After receiving an ACK or waiting for the ACK timeout period, the missing ACK count is updated (step 226) and the throughput curve is updated (step 228). The procedure then returns to step 202.

Figure 4:
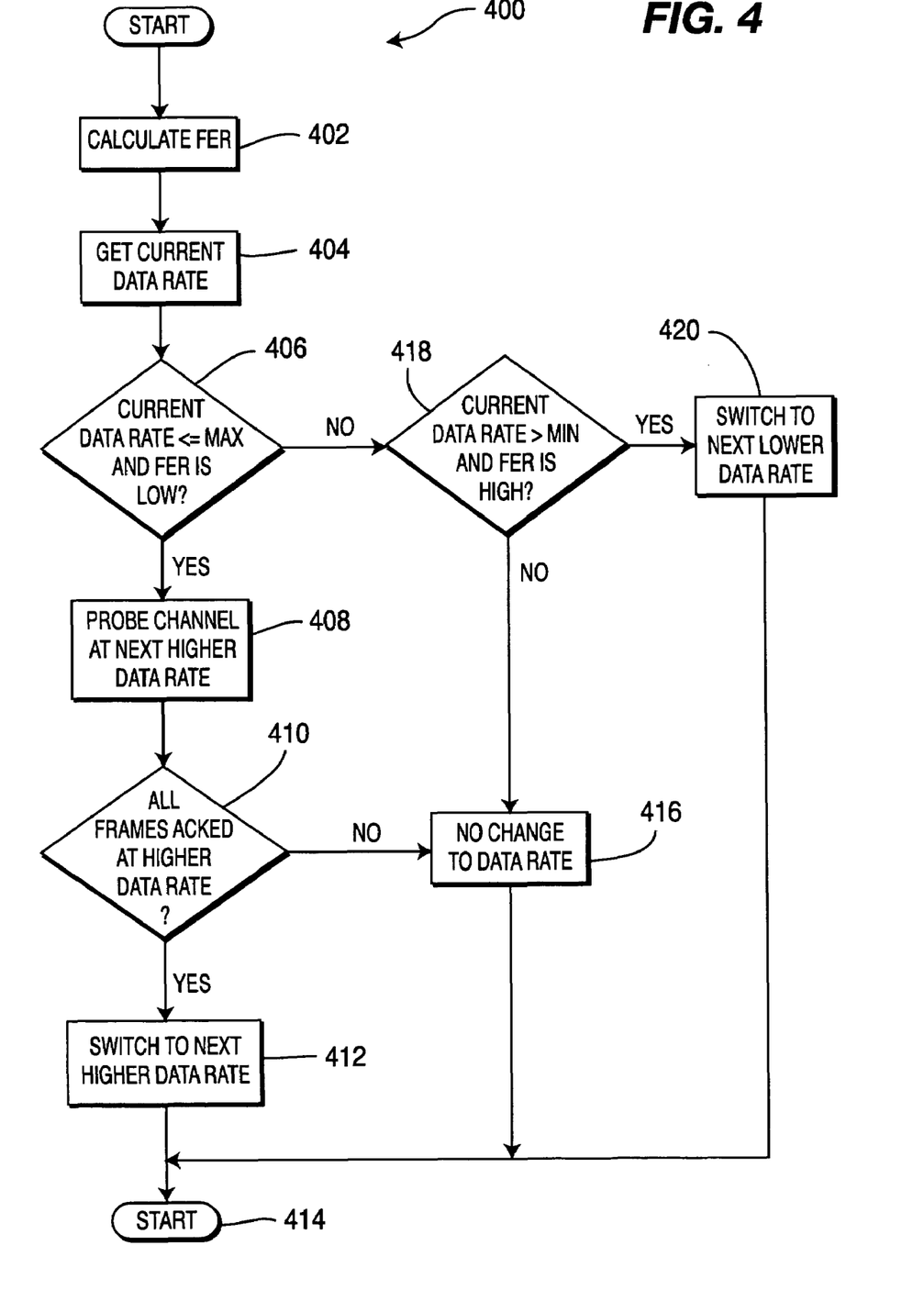
FIG. 4 is a flowchart of a missing ACK function used by the rate control procedure shown in FIG. 2.

The missing ACK function 400 (from step 236) is shown in FIG. 4. The function 400 begins by calculating the FER for a given period (step 402). The function 400 distinguishes if the frame is lost, partially missing (e.g., the CRC of a payload is bad, but the header information is intact), or received in error. The function 400 reacts more quickly when frames are lost than when frames are partially missing or received in error. The difference in how much of the frame is lost can be used to determine how to adjust the rate control. For example, the rate will be decreased less aggressively if there is a partial missing frame versus a completely lost frame.

The current data rate is then retrieved (step 404). A check is made whether the current data rate is less than or equal to the maximum data rate and whether the FER value is low (step 406). If both conditions are met, then the channel is probed at the next highest data rate for a predetermined number of frames (step 408). In one embodiment of the present invention, the channel is probed for at least one frame. If all of the frames sent at the higher data rate are ACKed (step 410), then the AP switches to the next higher data rate (step 412), and the function terminates (step 414).

If all of the frames sent at the higher data rate are not ACKed (step 410), then no change to the data rate is made (step 416) and the function terminates (step 414).

If the tests at step 406 are not satisfied, then a further evaluation is made to determine whether the current data rate is greater than the minimum data rate and the FER value is high (step 418). If both of these conditions are met, then the AP switches to the next lower data rate (step 420) and the function terminates (step 414). If these conditions (step 418) are not met, then no change to the data rate is made (step 416) and the function terminates (step 414).

Figure 5:
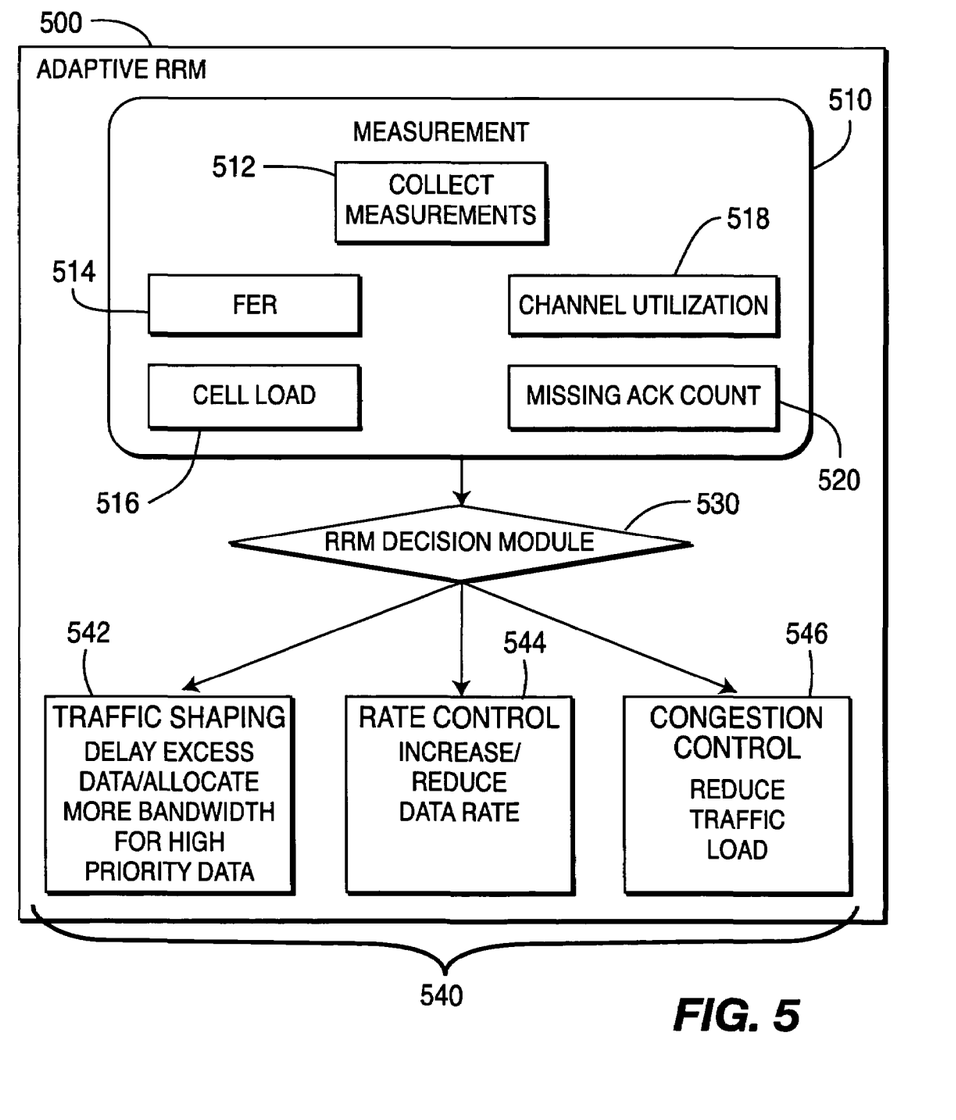
FIG. 5 is a diagram of an apparatus constructed in accordance with the present invention.

FIG. 5 is a diagram of an adaptive RRM apparatus 500 constructed in accordance with the present invention; in a preferred embodiment, the apparatus 500 resides on an AP. The apparatus 500 includes a measurement module (or device) 510, a RRM decision module 530, and at least one action module 540.

The measurement module 510 collects measurements from the hardware via a measurement collection module (or device) 512 and calculates performance metrics. The performance metrics calculated by the module 510 include FER 514, cell load 516, channel utilization 518, and missing ACK count 520. Additional metrics may be calculated by the measurement module 510 based upon collected measurements.

The RRM decision module 530 decides which action module 540 to call based upon the performance metrics and predetermined thresholds, as explained above in connection with FIG. 1. The action modules 540 perform the specific RRM actions, and include a traffic shaping module 542, a rate control module 544, and a congestion control module 546. Additional action modules 540 may be supplied to perform additional RRM functions.

It should be noted that while the present invention has, for simplicity, been described in the context of wireless LAN type technology, the present invention may be implemented in any type of wireless communication system. Purely by way of example, the present invention may be implemented in wireless LAN, UMTS-FDD, UMTS-TDD, TD-SCDMA, CDMA, CDMA2000 (EV-DO and EV-DV), or any other type of wireless communication system.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for adaptive radio resource management in a wireless communication system, the system including an access point and at least one wireless transmit/receive unit (WTRU), the method comprising the steps of:
   examining a frame error rate value of a WTRU;
   examining a channel utilization value of the WTRU;
   examining a current data rate of the WTRU;
   adjusting system parameters for the WTRU based on the examined variables, the adjusting step being performed by one of rate control, congestion control, and traffic shaping;
   wherein rate control is performed if one of the following conditions is satisfied:
      the channel utilization value is below a low channel utilization threshold and the current data rate is above a minimum data rate threshold; and
      the frame error rate value is below a low frame error rate threshold, the channel utilization value is above a high channel utilization threshold, and the current data rate is below a maximum data rate threshold;
   wherein congestion control is performed if the frame error rate value is above a low frame error rate threshold and the channel utilization value is above a high channel utilization threshold; and
   wherein traffic shaping is performed if one of the following conditions is satisfied:
      the frame error rate value is above a high frame error rate threshold and the channel utilization value is above a low channel utilization threshold; and
      the frame error rate value is above a high frame error rate threshold, the channel utilization value is below a low channel utilization threshold; and the current data rate is equal to a minimum data rate threshold.

2. The method according to claim 1, wherein the wireless communication system is a 802.11 wireless local area network, the access point is a 802.11 access point, and the WTRU is a 802.11 station.

3. The method according to claim 1, wherein the adjusting step, where performed by rate control, further includes the steps of:
   determining whether a downlink transmission has been made to the WTRU within a predetermined preceding time period;
   if a downlink transmission has been made, then using the data rate from the predetermined preceding time period as an initial data rate; and
   if no downlink transmission has been made, then selecting an initial data rate from at least one data rate used prior to the predetermined preceding time period.

4. The method according to claim 3, wherein the selecting step includes selecting the first data rate available among:
   the last transmitted data rate to the WTRU;
   the last received data rate at the WTRU; and
   the last transmitted data rate to any WTRU in the system.

5. The method according to claim 3, further comprising the steps of:
   evaluating the cell load; and
   adjusting the initial data rate based upon the traffic demand in the cell.

6. An apparatus for performing radio resource management (RRM) in a wireless communication system, comprising:
   a measurement device, for collecting measurements in the wireless communication system and for calculating one or more metrics based on the measurements;

a RRM decision device, for evaluating each of the one or more metrics against a predetermined threshold;

at least one RRM action device, selected from the group consisting of: traffic shaping, rate control, and congestion control, each RRM action device being triggered by said RRM decision device;

wherein said traffic shaping device is triggered if one of the following conditions is satisfied:
  a calculated frame error rate value is above a high frame error rate threshold and a calculated channel utilization value is above a low channel utilization threshold; and
  the calculated frame error rate value is above a high frame error rate threshold, the calculated channel utilization value is below a low channel utilization threshold; and a calculated current data rate is equal to a minimum data rate threshold;

wherein said rate control device is triggered if one of the following conditions is satisfied:
  the calculated channel utilization value is below a low channel utilization threshold and the calculated current data rate is above a minimum data rate threshold; and
  the calculated frame error rate value is below a low frame error rate threshold, the calculated channel utilization value is above a high channel utilization threshold, and the calculated current data rate is below a maximum data rate threshold; and wherein said congestion control device is triggered if the calculated frame error rate value is above a low frame error rate threshold and the calculated channel utilization value is above a high channel utilization threshold.

7. The apparatus according to claim 6, wherein the wireless communication system is a 802.11 wireless local area network (WLAN) and said apparatus is located at an access point in the WLAN.

8. The apparatus according to claim 6, wherein each of said one or more metrics is selected from the group consisting of: frame error rate, cell load, channel utilization, and missing acknowledgement count.

9. An integrated circuit for performing radio resource management (RRM) in a wireless communication system, comprising:
  a measurement device, for collecting measurements in the wireless communication system and for calculating one or more metrics based on the measurements;
  a RRM decision device, for evaluating each of the one or more metrics against a predetermined threshold;
  at least one RRM action device, selected from the group consisting of: traffic shaping, rate control, and congestion control, each RRM action device being triggered by said RRM decision device;

wherein said traffic shaping device is triggered if one of the following conditions is satisfied:
  a calculated frame error rate value is above a high frame error rate threshold and a calculated channel utilization value is above a low channel utilization threshold; and
  the calculated frame error rate value is above a high frame error rate threshold, the calculated channel utilization value is below a low channel utilization threshold; and a calculated current data rate is equal to a minimum data rate threshold;

wherein said rate control device is triggered if one of the following conditions is satisfied:
  the calculated channel utilization value is below a low channel utilization threshold and the calculated current data rate is above a minimum data rate threshold; and
  the calculated frame error rate value is below a low frame error rate threshold, the calculated channel utilization value is above a high channel utilization threshold, and the calculated current data rate is below a maximum data rate threshold; and wherein said congestion control device is triggered if the calculated frame error rate value is above a low frame error rate threshold and the calculated channel utilization value is above a high channel utilization threshold.

10. The integrated circuit according to claim 9, wherein the wireless communication system is a 802.11 wireless local area network (WLAN) and said integrated circuit is located at an access point in the WLAN.

11. The integrated circuit according to claim 9, wherein each of said one or more metrics is selected from the group consisting of: frame error rate, cell load, channel utilization, and missing acknowledgement count.

* * * * *

UNITED STATES PATENT AND TRADEMARK OFFICE
CERTIFICATE OF CORRECTION

PATENT NO. : 7,085,228 B2
APPLICATION NO. : 10/881606
DATED : August 1, 2006
INVENTOR(S) : Zaki et al.

It is certified that error appears in the above-identified patent and that said Letters Patent is hereby corrected as shown below:

At column 2, line 31, after the words "implemented in", delete "it that" and insert therefor --that it--.

At column 3, lines 33-34, after the word "link", delete "condition, which" and insert therefor --condition--.

At column 3, line 65, before "RRM", delete "a" and insert therefor --an--.

At column 4, line 8, before "RRM", delete "a" and insert therefor --an--.

At column 7, line 29, before "RRM", delete "a" and insert therefor --an--.

At claim 2, column 8, line 36, before "802.11", delete "a" and insert therefor --an--.

At claim 2, column 8, line 37, before "802.11", delete "a" and insert therefor --an--.

At claim 2, column 8, line 38, before "802.11", delete "a" and insert therefor --an--.

At claim 3, column 8, lines 40-41, after the words "wherein the", delete "adjusting step, where performed by rate control, further" and insert therefor --performing rate control step--.

At claim 6, column 9, line 1, before "RRM", delete "a" and insert therefor --an--.

At claim 7, column 9, line 34, before "802.11", delete "a" and insert therefor --an--.

At claim 9, column 10, line 1, before "RRM", delete "a" and insert therefor --an--.

UNITED STATES PATENT AND TRADEMARK OFFICE
CERTIFICATE OF CORRECTION

PATENT NO. : 7,085,228 B2
APPLICATION NO. : 10/881606
DATED : August 1, 2006
INVENTOR(S) : Zaki et al.

It is certified that error appears in the above-identified patent and that said Letters Patent is hereby corrected as shown below:

At claim 10, column 10, line 37, before "802.11", delete "a" and insert therefor --an--.

Signed and Sealed this

Seventeenth Day of April, 2007

JON W. DUDAS
*Director of the United States Patent and Trademark Office*